US007242672B2

(12) United States Patent
Kim

(10) Patent No.: US 7,242,672 B2
(45) Date of Patent: Jul. 10, 2007

(54) SYSTEM AND METHOD FOR FORMATTING VOICE DATA IN A MOBILE TELECOMMUNICATION SYSTEM

(75) Inventor: Dong Sung Kim, Soowun-si (KR)

(73) Assignee: LG Electronics Inc., Seoul (KR)

( * ) Notice: Subject to any disclaimer, the term of this patent is extended or adjusted under 35 U.S.C. 154(b) by 1078 days.

(21) Appl. No.: 10/017,589

(22) Filed: Dec. 18, 2001

(65) Prior Publication Data

US 2002/0077827 A1 Jun. 20, 2002

(30) Foreign Application Priority Data

Dec. 20, 2000 (KR) ............................... 2000-79015

(51) Int. Cl.
*H04Q 7/20* (2006.01)
*H04J 3/06* (2006.01)
*H04J 3/24* (2006.01)
*G10L 21/00* (2006.01)

(52) U.S. Cl. ...................... 370/328; 370/349; 370/350; 455/432.2; 704/270

(58) Field of Classification Search ................ 370/328, 370/349, 350; 455/432.2; 704/270
See application file for complete search history.

(56) References Cited

U.S. PATENT DOCUMENTS

| | | | | | |
|---|---|---|---|---|---|
| 5,526,397 | A | * | 6/1996 | Lohman | 455/560 |
| 5,734,979 | A | * | 3/1998 | Lu et al. | 455/445 |
| 6,018,521 | A | * | 1/2000 | Timbs et al. | 370/32 |
| 6,034,950 | A | * | 3/2000 | Sauer et al. | 370/310.2 |
| 6,049,543 | A | * | 4/2000 | Sauer et al. | 370/335 |
| 6,169,750 | B1 | * | 1/2001 | Tomono et al. | 370/474 |
| 6,198,755 | B1 | * | 3/2001 | Berry | 370/537 |
| 6,333,927 | B1 | * | 12/2001 | Han | 370/340 |
| 6,519,259 | B1 | * | 2/2003 | Baker et al. | 370/395.4 |

* cited by examiner

*Primary Examiner*—Alpus H. Hsu
(74) *Attorney, Agent, or Firm*—Ked & Associates, LLP

(57) ABSTRACT

A method and system to boost error recovery and synchronous tracking abilities is disclosed, using fixed code rate rules and synchronous data for connecting a voice call between mobile terminals. The system and method process packet data received from a BTS, expand the processed packet data based on a fixed code rate rule, and transmit the expanded packet data with framing information, inserted therein, to an MSC.

18 Claims, 3 Drawing Sheets

SYSTEM AND METHOD FOR FORMATTING VOICE DATA IN A MOBILE TELECOMMUNICATION SYSTEM

BACKGROUND OF THE INVENTION

1. Field of the Invention

The present invention relates to a mobile telecommunication system and, more particularly, to formatting voice data in a mobile telecommunication system.

2. Background of the Related Art

FIG. 1 illustrates a configuration of a mobile telecommunication system in the related art. Referring to FIG. 1, when a mobile subscriber communicates voice data with a wire subscriber, the mobile telecommunication system compresses the voice call in a mobile terminal (MT) 1*a*–1*n* and transmits the compressed voice call to a base station controller (BSC) 3*a*–3*n*, via a base transceiver station (BTS) 2*a*–2*n*. The voice call can be compressed into digital data by a compression algorithm. The BSC 3*a*–3*n* converts the compressed digital data into pulse code modulation (PCM) data and transmits the PCM data to a mobile switching center (MSC 4. To convert the compressed digital data into PCM data, the BSC 3*a*–3*n* employs a vocoder. The MSC 4 can transmit the PCM data to a public switched telephone network (PSTN) 8, in which the corresponding wire subscriber is matched. The corresponding wire subscriber can be selected by a switching circuit.

So far, the method of providing a voice call generated by the MT 1*a*–1*n* of the mobile subscriber to the wire subscriber has been explained. Similarly, it is also possible to provide the voice call from the wire subscriber to the MT 1*a*–1*n* following the same procedure described above in an inverse order. In addition, to provide the voice call from MT 1*a* to another MT 1*n*, the same procedure can be applied, again.

In other words, the vocoder of the BSC 3*a*–3*n* can convert the compressed digital data from the MT 1*a*–1*n* to PCM data. Unfortunately however, as the vocodet repeatedly conducts the conversion process from the compressed digital data into the PCM data, it increases the quantization error as well, deteriorating the sound quality as a result.

As an attempt to solve the above problem, another method has been tried. For example, when the vocoder in the BSC 3*a*–3*n* should provides the voice call between mobile subscribers, the vocoder does not convert the compressed data from the BTS 2*a*–2*n* into PCM data to deliver it to the MSC 4. Instead, the vocoder sends the voice data to the MSC 4 after packetizing it to have a certain format. This operation can be carried out when a bypass mode is designated by a call process control of the BSC 3*a*–3*n* and the MSC 4. Also, if the vocoder at a receiver is in the bypass mode, the vocoder can recognize the data received from the MSC 4, through the communication time slot, as a voice packet data in the bypass format, not the PCM format. Then, the vocoder will decompose the data right away and send out a corresponding voice packet to the BTS.

FIG. 2 is a related art configuration of a vocoder inside of a BTS 2*a*–2*n* controller. The vocoder 20 includes a packet matcher 21, a voice coder/decoder 22, a bypass controller 23 and a PCM matcher 24. In the case of connecting the voice call between mobile subscribers with this vocoder, if the voice packet is transmitted to the packet matcher 21 from the BTS 2*a*–2*n*, the packet matcher 21 matches the voice packet and sends the matched voice packet to the voice coder/decoder 22, instead of the bypass controller 23.

The vocoder 22 is preferably pre-designated in the bypass mode. The bypass controller 23 transmits the voice packet to the time slot as it is. The voice packet transmitted to the time slot undergoes the packeting process in a special format and is sent out to the MSC 4 via the PCM matcher 24. Data received from the MSC 4 proceeds in a reverse order, of the aforementioned transmitting procedure for the voice packet, and is sent to the bypass controller 23. Later, the vocoder recognizes the data as the voice packet data, decomposes the data, and finally sends the voice packet to the BTS.

FIG. 3 illustrates a data configuration of a bypass packet of the vocoder in the related art. The bypass packet format comprises up to 40 bytes of data in total, including a maximum 32-byte encoding packet data 33 received from the BTS 2*a*–2*n*, a 4-byte message 32 for transmitting a signal, and a 4-byte preamble 31 for distinguishing a final/ending message. Additionally, the bypass packet may include a 290-bit dummy 34 and 30-bit cyclic-redundancy-code (CRC) 35. Thus, the packet data format can include up to a total of 80-bytes of data, and the packet data format can go through the same procedure one more time before it is transmitted. After being formatted, the bypass packet is sent to the MSC 4.

On the other hand, when a synchronous system is involved, 32-byte encoding packet data 33 is transmitted and received every 20 ms between the BTS 2*a*–2*n* and the BSC 3*a*–3*n*. Further, between the BSC 3*a*–3*n* and the MSC 4, a 1-byte bypass packet every 125 us (i.e., a 160-byte bypass packet every 20 ms) can be transmitted and received.

FIG. 4 illustrates an operational procedure of the bypass mode. The formation of the bypass packet format includes adding the 4-byte message 32 on the basis of the 32-byte encoding packet data 33 (S41) and further adding the 4-byte preamble 31 (S42). In addition, after adding the dummy 34 and the CRC 35 to the encoding packet data 33, the message 32 and the preamble 31 (S43 and S44), the adding process (S41–S44) is repeated entirely to generate a second block of data with the same length (i.e., 80 bytes) (S45). Together, the two blocks of data complete the final bypass packet format (160 bytes). A final bypass packet of this form is delivered to the MSC 4, by communicating 1 byte every 125 us (S46). Meanwhile, the packet data received from the MSC 4 is decomposed in a reverse order of the above-described procedure, and the encoding packet data 33 is extracted from the packet data format and sent to the BTS 2*a*–2*n*.

The most typical and generic data length that is effective in the related art is within a range of 32 to 36 bytes. If the preamble is added, the maximum continued data length reaches 40 bytes. Accordingly, the voice data used in practice is approximately one fourth of the total 160 bytes. Therefore, data resources are often wasted. Moreover, during the repetition of the packet data format operation, it is always possible that 80-byte data of the first half frame 30*a*, in FIG. 3, can include an error. In this case, the BTS 2*a*–2*n* has to resend the correct data. That is to say, if the first half frame 30*a* or the second half frame 30*b* of the 80-byte packet data format contains an error, in a particular bit, it is regarded as a CRC error and the BSC 3*a*–3*n* recognizes the data as being invalid. Thereby, information on the error occurrence or a useful and effective handling method are precluded.

In addition, in terms of the properties of the voice data in the real time mode, no band width assigned for resending the voice data in the next 20 ms frame. Although it seems possible to regenerate and send the regenerated packet data frame, in practice the entire frame (30*a* and 30*b*) can be at risk of losing validity for even 1-bit error. Even worse, there is no way to correct the error.

If the preamble 31, identifying a start point of the packet data, has an error during the bypass mode of operation, the valid start point is nowhere to be found. Also, when combining the preamble 31 with the encoding packet data 33, the encoding packet might have its own preamble as well. In such a case, it is impossible to find the start point of the frame.

If, by any chance, a 160-byte frame is lost, not only is the voice data no longer valid but also a synchronization with the next frame is no longer valid. The synchronization loss requires a considerable amount of time to overcome, when it occurs for a large number of frames.

Therefore, the related art is very disadvantageous in that it fails to accomplish an original goal of improving the quality of sound, during the voice call between mobile terminals, by reducing the quantization procedure.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is, therefore, an object of the present invention to provide a method for formatting voice data in a mobile telecommunication system in order to prevent any loss of voice data.

It is another object of the present invention to improve sound quality by improving a data format, when connecting a voice call between mobile terminals.

To achieve the above objects, a preferred embodiment of the present invention provides a method for formatting voice data in a mobile telecommunication system. The method includes processing packet data received from a BTS, expanding the processed packet data using fixed code rate rules, inserting framing information into the expanded packet data, and transmitting the packet data with the framing information to a MSC.

According to the method for formatting voice data in a mobile telecommunication system, the fixed code rate rule can be made by repeating each bit of the processed packet data at the equivalent value.

Further, in accordance with the method for formatting voice data in a mobile telecommunication system of the present invention, the framing information represents synchronous information, and a plurality of bits configured from 0 or 1 are generated on a regular time basis. Here, the combination order of the plural bits can be pre-designated.

Preferably, the method for formatting voice data in a telecommunication system further includes extracting framing information from the packet data received from the MSC, wherein the packet data is expanded by as many times as the pre-designated times that has been set up based on the repetition of the equivalent value in each bit; restoring the size of the packet data to the original size of the packet data; and transmitting the restored and processed packet data to the BTS.

Particularly, restoring the size of the packet data to the original size of the packet data further includes judging whether a repeated times at the equal value based on each bit of the packet data is in accord with the pre-designated times; converting each bit of the packet data into the majority values, if a repeated times at the equal value based on each bit of the packet data is not in accord with the pre-designated times; and diminishing the size of each bit to be the same size with the inverse number of the pre-designated times.

Another preferred embodiment of the present invention provides a mobile telecommunication system, which includes a first BSC for converting voice data received from the first BTS into a fixed packet format and for transmitting the converted voice data to a MSC. A second BSC for converts the voice data received from the MSC into a fixed packet format and transmits the converted voice data to the second BTS. In addition, there is provided a method for transmitting voice data in a mobile telecommunication according to the subject embodiment of the present invention, wherein the first BSC expands the voice data from the first BTS plus pre-designated information, using a fixed code rate rule; inserts synchronous information into the expanded voice data; and transmits the voice data with the synchronous information to the MSC. The second base controller extracts the synchronous information based on the voice data received from the MSC, whose bit has been repeatedly expanded according to the pre-designated times; restores the original voice data by adjusting the bit size of the voice data, to correspond to the inverse number of the pre-designated times; processes the restored voice data; and transmits the processed voice data to the second BTS.

The objects of the present invention may be further achieved in whole or in part by a communication method, including encoding original information as encoded information, comprising the original information and redundant information, using a coding scheme, generating transport information by overwriting portions of the encoded information with framing information, transmitting the transport information to a receiver, extracting the framing information from the transport information, synchronizing the encoded information at the receiver using the extracted framing information, and regenerating the original information by decoding the encoded information, wherein the redundant information of the encoded information is used to regenerate the original information lost due to the overwriting of the encoded information with the framing information.

The objects of the present invention may be further achieved in whole or in part by a communication system, including an encoder that encodes original information as encoded information, comprising the original information and redundant information, using a coding scheme, an information framing unit that generates transport information by overwriting portions of the encoded information with framing information, a transmitter that transmits the transport information to a receiver, a framing information extraction unit that extracts the framing information from the transport information received by the receiver, a synchronization unit that synchronizes the encoded information at the receiver using the extracted framing information obtained by the framing information extraction unit, and a decoder that regenerates the original information by decoding the encoded information, wherein the redundant information of the encoded information is used to regenerate the original information lost due to the overwriting of the encoded information with the framing information.

Therefore, the method for formatting voice data in a mobile telecommunication, described above, enables the synchronization of the extracted data to be determined based on the combination order.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
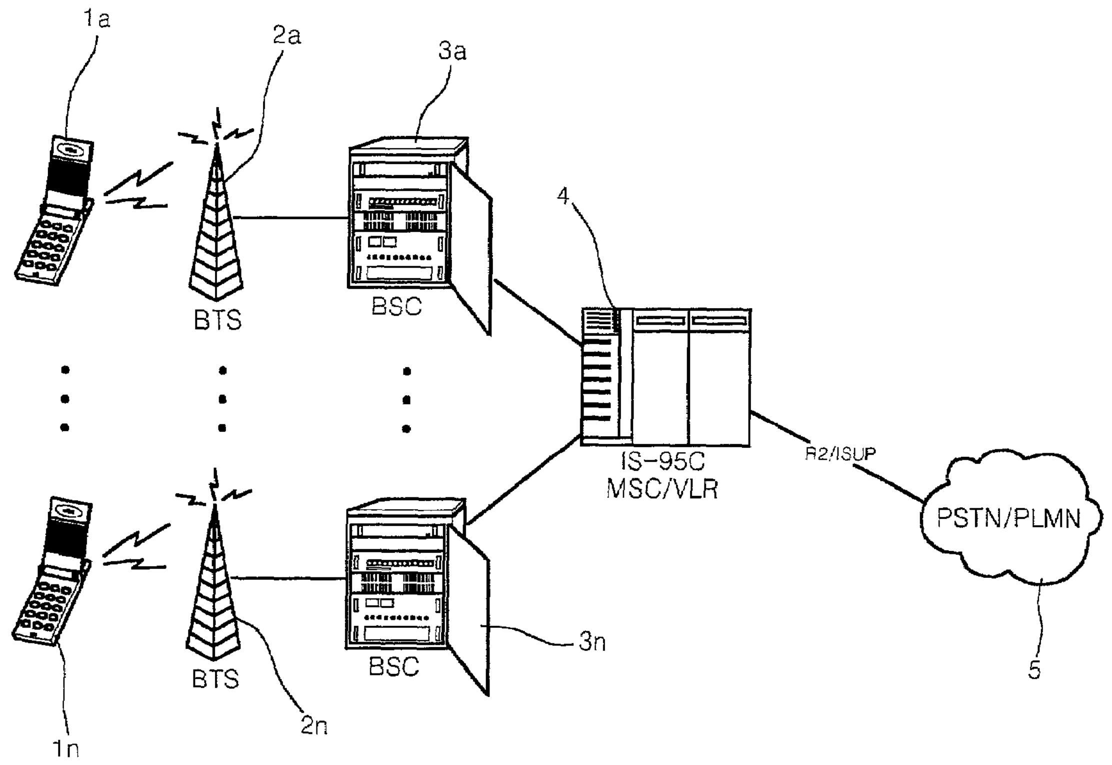
Fig. 1(Related Art)
FIG. 1 illustrates a configuration of a mobile telecommunication system in accordance with the related art.
Figure 2:
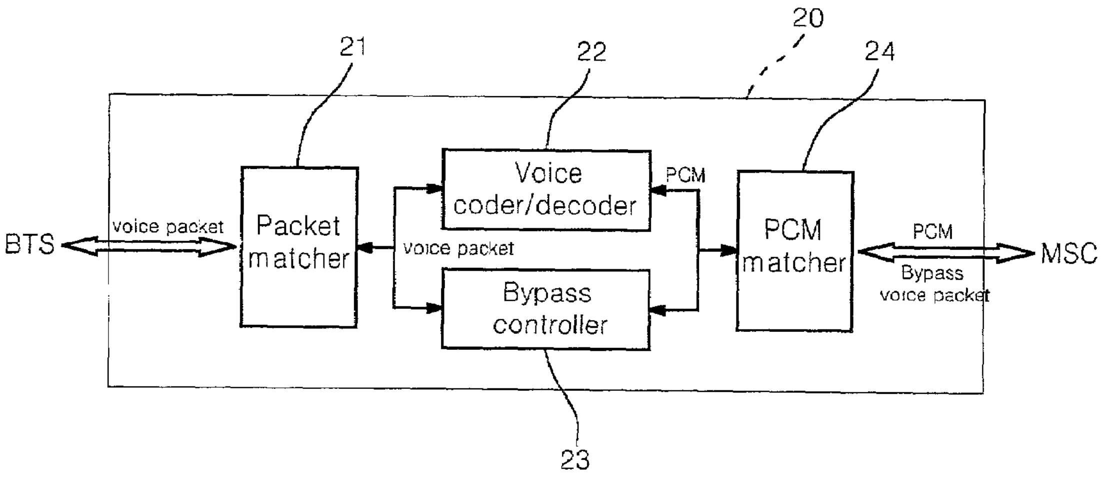
Fig. 2(Related Art)
FIG. 2 illustrates a configuration of a vocoder inside the BSC of FIG. 1, in accordance with the related art.
Figure 3:
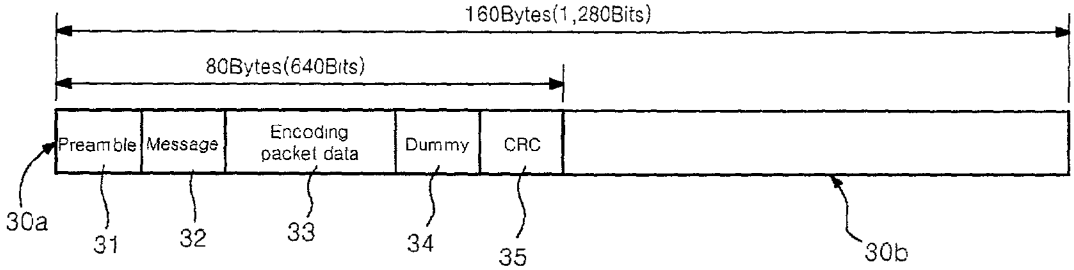
Fig. 3(Related Art)
FIG. 3 illustrates a configuration of bypass packet data of a vocoder, in accordance with the related art.
Figure 4:
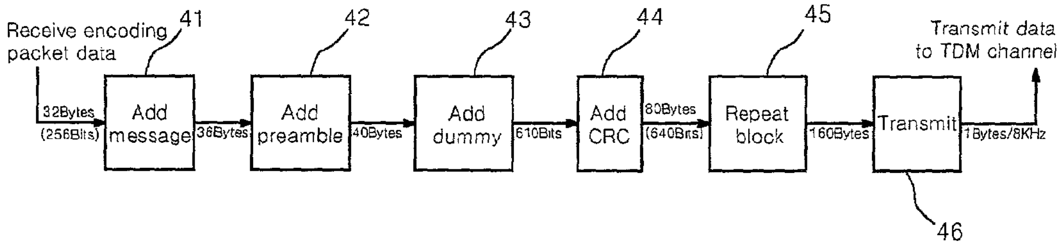
Fig. 4(Related Art)
FIG. 4 illustrates a flow chart of a vocoder bypass operation, in accordance with the related art.
Figure 5:
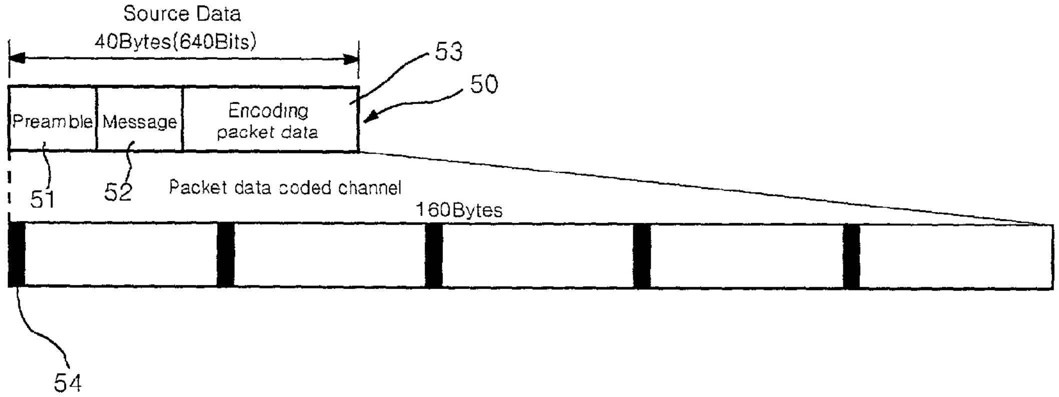
FIG. 5 illustrates a configuration of bypass packet data of a vocoder, in accordance with a preferred embodiment of the present invention.

FIG. 5 is a configuration of a bypass packet of a vocoder according to the present invention. The bypass packet 50 includes a preamble 51, a message 52, and encoding packet data 53. The bypass packet 50, unlike a bypass packet in the related art, does not include a dummy and a cyclic redundancy code (CRC). Instead of including the dummy and the CRC, which are somewhat useless in the present invention, the bypass packet 50 leaves them out and utilizes the recovered bandwidth. As explicitly shown in FIG. 5, the bypass packet 50 can be expanded up to 160 bytes through a series of procedures, and framing information 54 can be inserted in fixed positions of the 160 bytes. The framing information 54 includes a plurality of bits and can be generated on a regular time basis (e.g., 20 ms).

Figure 6:
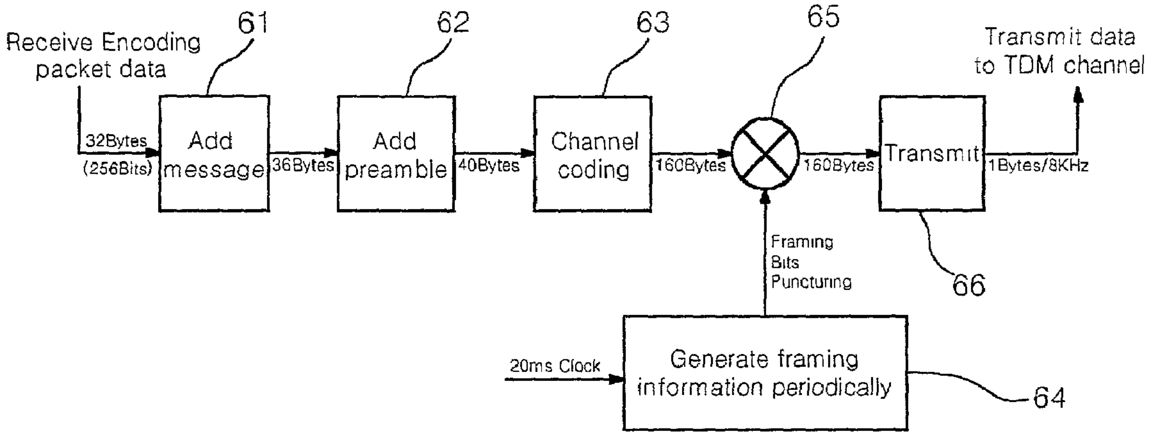
FIG. 6 and FIG. 7 illustrate a data processing procedure during a voice call between mobile terminals, in accordance with a preferred embodiment of the present invention.

A method for transceiving the bypass packet illustrated in FIG. 5 is now explained with reference to FIG. 6 and FIG. 7. FIG. 6 illustrates the method for transmitting the converted encoding packet data to the mobile switching station.

Referring to FIG. 6, when the encoding packet data 53 (32 bytes) from the BTS 2*a*–2*n* is received, the vocoder in the BSC can add the pre-designated preamble 51 (4 bytes) and the message 52 (4 bytes) to the encoding packet data 53 (S61 and S62). Since the procedure applied above is identical with that of the related art, further details on the subject procedure will not be provided here. The vocoder conducts a channel coding on the basis of the packet data 50 (40 bytes), including the preamble 51 and the message 52 (S63). Here, the channel coding can be performed using the fixed code rate rule. In other words, what the channel coding rule means is that the process is performed repeatedly, until each bit of the packet data is reproduced the pre-designated number of times.

For example, suppose that the pre-designated number of times is 4 and a certain bit value of the packet data is '1'. Applying the code rate rule the value '1' is converted to '1111'. Of course, the encoding packet data having a '0' bit value is converted into '0000'. Therefore, if the channel coding is carried out, the packet data 50 (40 bytes) with the preamble 51 and the message 52 is expanded to 160 bytes. In short, the channel coding procedure expands the packet data to a certain size, without difficulties.

When the channel coding is conducted, the framing information generated on a regular time basis can be inserted into the channel coded packed data (S64 and S65). The synchronous framing information is used for chasing frame synchronization, later, and includes a plurality of bits configured as 0 or 1. The combination order of the plural bits within the framing information can be designated beforehand. An important thing to be aware of is that each bit of the framing information can be inserted into any place of the pre-generated, 160-byte encoding packet data. This is so for the following reason. If one bit of the framing information is inserted in a certain location, causing a bit value of the original packet data to change the value of the original bit changed by this operation, is restored when the receiver changes each received bit value of the packet data to the value indicated by a majority of the corresponding redundant coding bits. Accordingly, the packet data in which the framing information is inserted can be sent out to the MSC 4 through a transmitter (S66).

Figure 7:
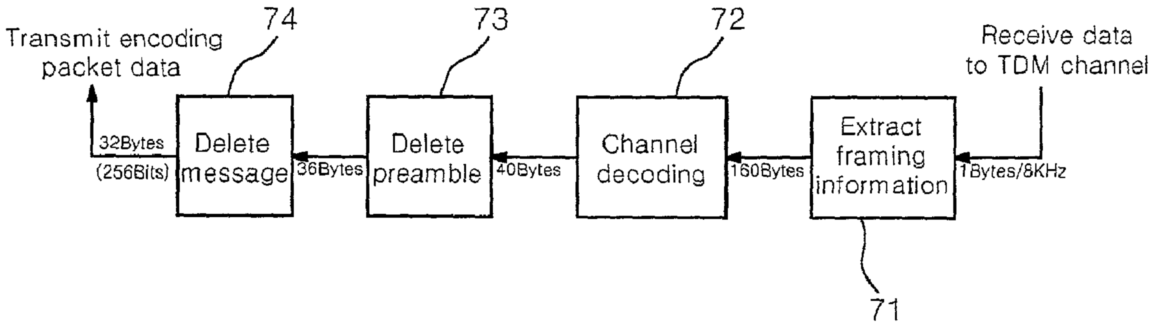

FIG. 7 illustrates a procedure of receiving the encoded packet data through the receiver of the BSC 3*a*–3*n*. When the encoded packet data is received from the MSC 4, the vocoder in the BSC 3*a*–3*n* extracts framing information from it (S71). The coded packet data is the expanded 16-byte packet whose every bit is repeated over and over the pre-designated number times by another BSC 3*a*–3*n*, supporting the other party's mobile terminal.

The packet synchronization of the packet data is decided based on whether the combination order of each bit of the extracted framing information is in accord with the pre-designated combination order. In the case that the received combination order and the pre-designated combination order are identical, the packet data is regarded as normal and the normally processed packet data can be transmitted to the BTS 2*a*–2*n*. On the other hand, if the received combination order differs from the pre-designated combination order, due to a potential packet data error, the BSC 3*a*–3*n* can request that the MSC 4 retransmit the 160-byte expanded frame.

The vocoder restores the packet data size to the original data size through the channel decoding procedure (S72). Before performing the channel decoding process, the vocoder judges whether the number of times the packet data is repeated is accord with the pre-designated number of times.

If the number of times each bit is repeated is not in accord with the pre-designated number of times, each bit of the packet data can be changed to the value indicated by a majority of the corresponding redundant values. For instance, suppose that the original packet data is '1' and is channel coded to '1111', by the transmitting BSC 3*a*–3*n* of the other party, on the way to the receiving BSC via the MSC 4. If the second coded bit value is converted into '0', that is, the packet data is received as '1011', the vocoder recognizes the majority of the redundant bits have the value '1' and converts the 4 bits '1011' into '1111'. The procedure can be applied to the rest of the bits of the coded packet data to be converted.

In addition, the bit size can be diminished to the size of the inverse number of the designated times by the channel decoding. In other words, the redundant bits can be removed so that the 160-byte coded packet data, of the previous example, is reduced to its prior un-encoded size of 40 bytes. Complying with the code rate rule, the packet data of the present invention has been expanded to 4 times the original size, meaning that the packet data can be diminished to one fourth of the original size by the channel decoding. That is to say, '1111' can be diminished to '1'. Similarly, other bits of the packet data can be diminished as well.

Later, the vocoder deletes the preamble and the message from the channel decoded packet data and transmits the remaining packet data to the BTS 2a–2n (S73 and S74).

In conclusion, the present invention to transceives the packet data using the code rate rule and the framing information, thereby overcoming any possible problems generated frequently during the bypass mode operation in the related art. In addition, the method of the present invention advantageously improves the data-recovery rate upon the occurrence of errors, which consequently prevents any voice data loss in the voice call between mobile terminals, and further provides much improved mobile telecommunication service.

In addition, the present invention makes use of the bandwidth, which the dummy and CRC used in the related art, for the channel coding, by which it can more effectively use the band.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for formatting voice data comprising:

processing voice packet data received from a base transceiver station (BTS);

expanding the processed voice packet data using a fixed code rate rule;

transmitting the expanded voice packet data with framing information to a mobile switching center (MSC);

extracting second framing information within a second expanded voice packet data received from the MSC, wherein the voice packet data received from the MSC is expanded by reproducing each bit value of the voice packet data and sequentially integrating the reproduced bit values with the corresponding original bit value.

2. The method of claim 1, wherein a preamble and a message are integrated in the packet data during the processing step.

3. The method of claim 1, wherein the fixed code rate rule repeatedly generates an equivalent value for each bit of the processed packet data.

4. The method of claim 3, wherein the number of times the fixed code rate rule repeatedly generates the equivalent value for each bit is pre-designated.

5. The method of claim 1, wherein the framing information is synchronous information.

6. The method of claim 5, wherein the framing information is comprised of a plurality of bits, having values of 0 or 1, and is generated on a regular time basis.

7. The method of claim 6, wherein a combination order of the plurality of bits is pre-designated.

8. The method of claim 1, wherein the framing information is inserted in the expanded voice packet data at regular intervals.

9. The method of claim 1, further comprising:

restoring a size of the second expanded voice packet data to an original size of the voice packet data received from the MSC;

processing the restored voice packet data; and transmitting the restored and processed voice packet data to the BTS.

10. The method of claim 9, wherein restoring the size of the voice packet data to the original size comprises:

determining whether the second expanded voice packet data contains the pre-designated number of bit value reproductions for each bit value of the voice packet data received from the MSC;

converting each bit of the second expanded voice packet data to the value identified by a majority of an original bit value and the corresponding reproduced bit values; and diminishing the size of the second expanded voice packet data to the original size of the voice packet data received from the MSC by removing the reproduced bit values.

11. The method of claim 10, further comprising removing the pre-designated number of reproduced bit values corresponding to each of the original bit values, if the original bit value has the pre-designated number of corresponding reproduced bit values.

12. The method of claim 9, wherein processing the restored voice packet data is accomplished by deleting a preamble and a message integrated within the restored voice packet data.

13. A method for formatting voice data in a mobile telecommunication system, wherein the system has a first base station controller (BSC) that converts the voice data received from a first base transceiver station (BTS) into a fixed packet format and transmits the converted voice data to a mobile station controller (MSC); and a second BSC that converts the voice data received from the MSC into the fixed packet format and transmits the converted voice data to a second BTS, the method comprising:

expanding the voice data, from the first BTS, and pre-designated information using a fixed code rate rule at the first BSC;

inserting synchronous information into the expanded voice data at the first BSC;

transmitting the expanded voice data with the synchronous information to the MSC;

extracting the synchronous information from the expanded voice data received from the MSC;

restoring the voice data by removing redundant information of the expanded voice data added by the fixed code rate rule expansion;

processing the restored voice data at the second BSC; and transmitting the processed voice data to the second BTS.

14. The method of claim 13, wherein the fixed code rate rule repeatedly generates an equivalent value for each bit in the voice data, including the pre-designated information.

15. The method of claim 13, wherein the synchronous information is inserted into the expanded voice data at regular intervals.

16. The method of claim 13, further comprising:

judging whether each redundant value within the expanded voice data is changed after each corresponding bit of the voice data is expanded a pre-designated number of times according to the fixed code rate rule; and converting each bit value of the expanded voice data to the value identified by a majority of an original bit value of the voice data and the corresponding redundant values generated according to the fixed code rate rule.

17. The method of claim 13, wherein the synchronous information is comprised of a plurality of bits, having values of 0 or 1, whose combination order is pre-designated and generated on a regular time basis.

18. The method of claim 13, wherein a synchronization of data is decided based on a combination order of the extracted synchronous information.

* * * * *